Jan. 10, 1961 T. I. RESS 2,967,664

ELECTRO-OPTICAL DATA PROCESSING SYSTEM

Filed March 21, 1960 4 Sheets-Sheet 1

INVENTOR.
THOMAS I. RESS

BY Paul M. Brennan

AGENT

Jan. 10, 1961 T. I. RESS 2,967,664

ELECTRO-OPTICAL DATA PROCESSING SYSTEM

Filed March 21, 1960 4 Sheets-Sheet 2

Jan. 10, 1961 T. I. RESS 2,967,664

ELECTRO-OPTICAL DATA PROCESSING SYSTEM

Filed March 21, 1960 4 Sheets-Sheet 4

United States Patent Office 2,967,664

Patented Jan. 10, 1961

2,967,664

ELECTRO-OPTICAL DATA PROCESSING SYSTEM

Thomas I. Ress, Los Angeles, Calif., assignor to International Business Machines Corporation, New York, N.Y., a corporation of New York

Filed Mar. 21, 1960, Ser. No. 16,558

23 Claims. (Cl. 235—61.6)

This invention relates to a data processing system, and particularly to such a system employing electro-optical devices.

This application is a continuation-in-part of an application for Letters Patent of the United States, Serial No. 626,421, filed on December 5, 1956, now abandoned.

Contemporary data processing systems are known in which mechanical, electromechanical and electronic devices are employed. Such systems are limited in their application by their inability to process data representing light pulses. An electro-optical data processing system has certain advantages over the currently recognized systems. Electro-optical processing is extremely rapid, possessing time constants ranging from $10^{-3}$ to $10^{3}$ microseconds. There are no problems of mechanical motion, and the information may be stored on thin films of certain solids. Optical techniques also lend themselves to simultaneous processing and transferring of entire groups of data. In addition the cost for a bit of storage in an electro-optical processing system is lower than in other methods of information storage.

In applicant's device, perforated record material fed from the feed hopper of a business machine is sensed optically and the light pulses so developed are converted into a suitable code for processing. For example, decimal information optically read from record material may be converted into light pulses in a binary code. A group of light guides or rods then channel the coded light pulses to an electro-optical switch, which may have any number of switching positions. For example, two positions will permit the data representing light pulses to be switched simultaneously or separately to the data section or the program section of the processing system.

The coded light pulses that are switched to the data section of the processing system are channeled by another group of light guides to an input data deflector. A deflection coil associated with said deflector controls the deflection of the coded light pulses at the output of the deflector. Actually the input light pulses are first converted to photoelectrons, which are then shifted to strike selected locations of the phosphor output surface, where they are reconverted to light pulses. A description of a two-element phototube that may be used in this data processing system may be found, for example, in the Mellon Institute of Industrial Research Quarterly Report No. 10 of the Computer Components Fellowship No. 347, January 11, 1953 to April 10, 1953. The deflected pulses emitted by the deflector are then optically transferred to a suitable storage device, which may take the form of an insulated, semiconductive or conductive solid. A photosensitive ionization chamber suitable for such use is shown in an article by K. S. Lion, "A Method of Increasing Photographic Sensitivity by Electrical Discharges," Journal of Applied Physics (March 1953), vol. 24, No. 3.

Readout from storage is accomplished optically by an output data deflector which then makes the coded light pulses available to the input deflector through a light guide feedback arrangement, to an accumulator, and/or to an output device for permanent recording in some such manner as printing or punching.

The coded light pulses that are switched to the program section of the processing system are channeled through light guides and a program deflector into storage. The program pulses are read out of storage and channeled to a multielement converter, which converts said program-representing light pulses into program-representing control voltages for operating electrical control circuits. For example, the control voltages may operate conventional cathode follower tubes which energize relays. The contacts operated by said relays in turn control the application of suitable voltages to the various electro-optical devices of the data processing system.

Conventional electrical counters serve to control the stepping potential applied to the deflection coils of the data and program deflectors. In the disclosed embodiment of the invention, the voltages developed by two counters operate relays, whose contacts connect voltages in steps to the deflection coils. This permits readin to storage at different areas and readout from said different areas without physically moving the deflectors or their associated pulse transfer lenses.

The phosphors and photoemissive elements employed in the electro-optical devices of this data processing system are conventional in character. For example, suitable phosphors which can be used are fully described in Horace H. Homer et al., "Electro-luminescent Zinc Sulphide Phosphors," Journal of the Electrochemical Society (December 1953) vol. 100, No. 12, pages 572–579.

Thus, the principal object of this invention is to provide a novel data processing system capable of speedy and flexible processing of data representing radiant energy pulses.

Another object is to provide an electro-optical data processing system in which program and data representing radiant energy pulses may be stored indefinitely, and in which processing of the data representing pulses is accomplished in accordance with the stored program representing pulses.

Another object is to provide an electro-optical data processing system in which data representing radiant energy pulses are processed under the control of program representing radiant energy pulses, with said latter pulses being converted into electrical pulses for the purpose of operating electrical circuits which control the electro-optical devices that form the data section of said processing system.

The foregoing and other objects, features and advantages of the invention will be apparent from the following more particular description of a preferred embodiment of the invention, as illustrated in the accompanying drawings.

Figures 4, 6B:
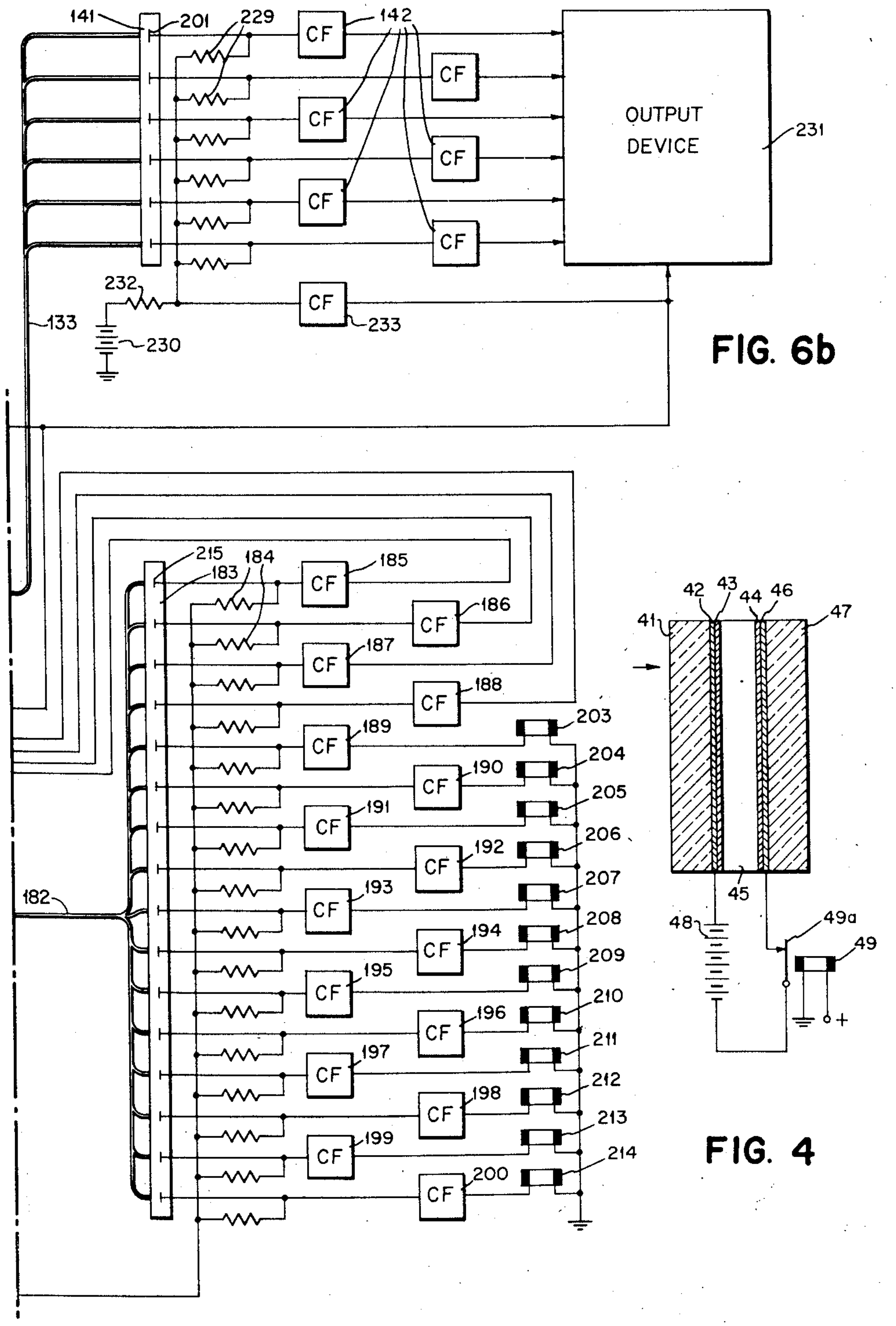
Fig. 4 illustrates a light pulse storage device.
Figure 6A:
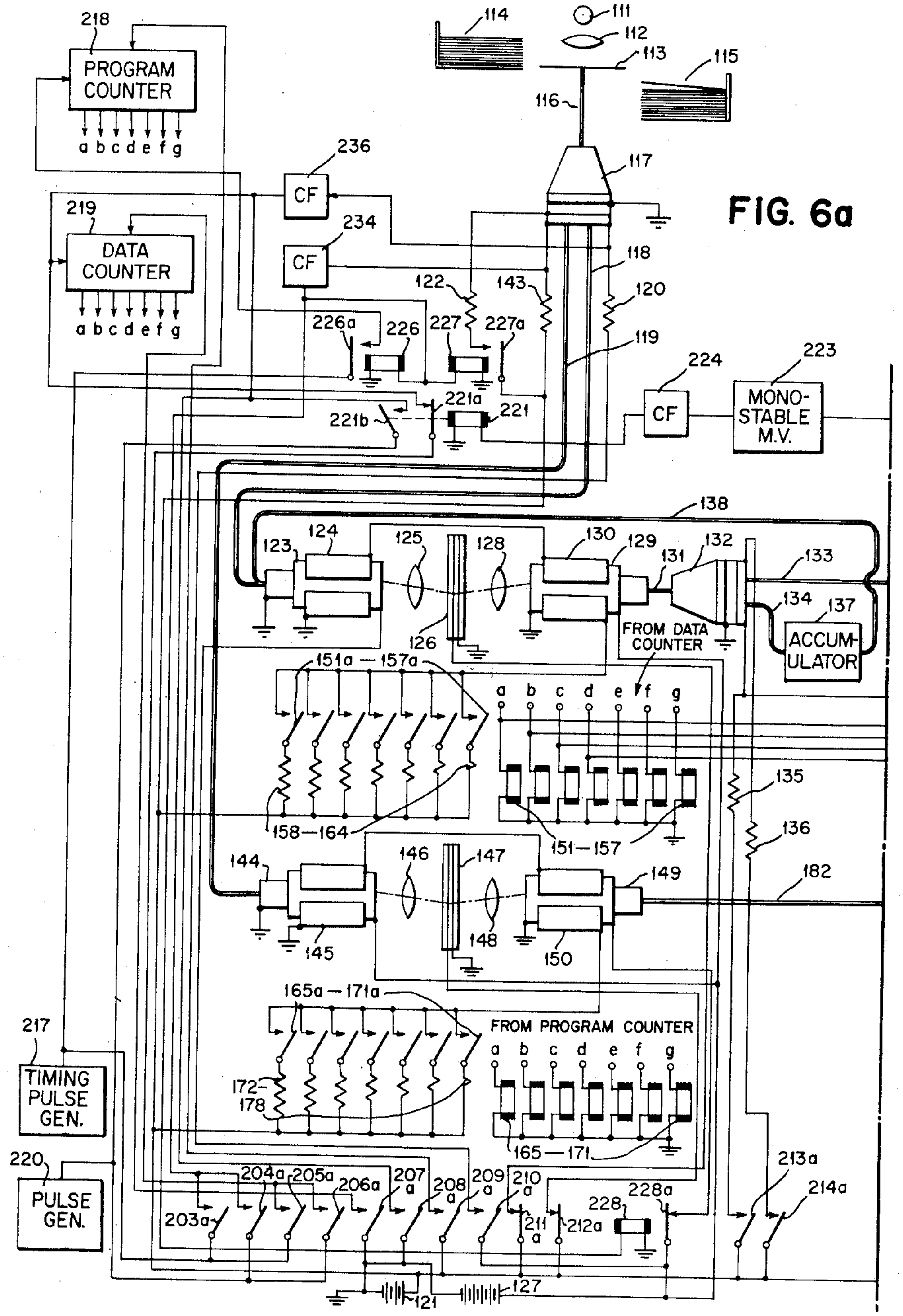

Figs. 6*a* and 6*b* illustrate a more detailed schematic diagram of a data processing system according to the invention.

Figure 7:
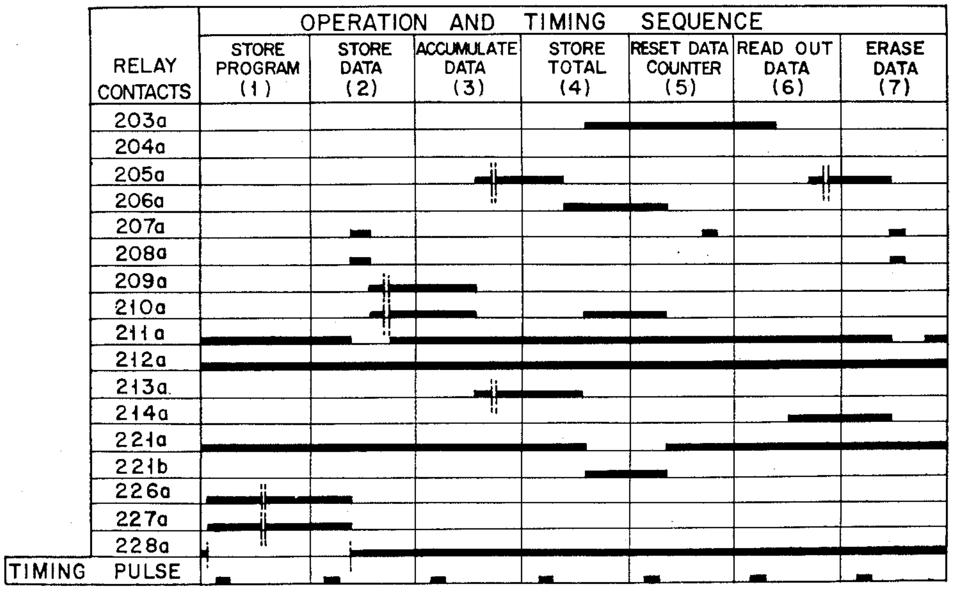

Fig. 7 illustrates a timing chart of operation for the data processing system of Fig. 6.

*Description of basic components*

In order to process data electro-optically it is necessary to employ devices that most efficiently transfer, store and accumulate radiant energy pulses under the control of electrical potentials. Figs. 1–5 illustrate the electro-optical building blocks which are interconnected to form the data processing system according to the invention, and are now described.

Figure 1:
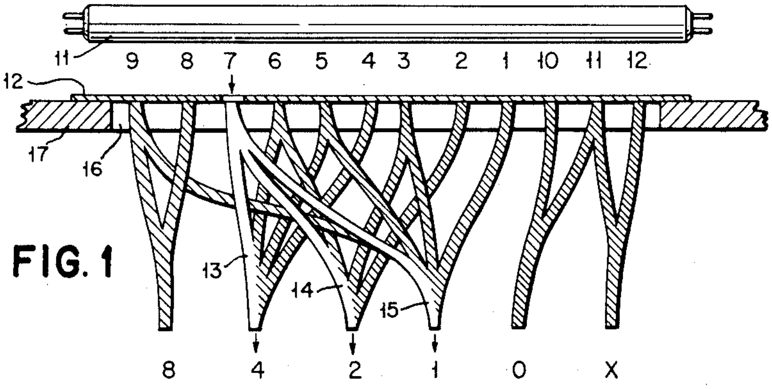
Fig. 1 illustrates a light pulse translator for converting decimal values into binary form.

Fig. 1 illustrates one type of light pulse translator that may be used in the disclosed electro-optical data processing system. Such a code translator consists of light pulse channeling guides or rods that are interconnected in a matrix fashion for the purpose of converting decimal values into binary values. Light beams developed by a light source are introduced to certain input ends of channeling guides in accordance with the perforations on a record material. As shown in Fig 1, the record card 12 is perforated in position 7, representing a decimal 7, thereby transmitting light through said perforation to light guides 13, 14, 15, which represent the value 7 in the form of a binary code. None of the other light guides receive light beams from source 11 at this time. The light guides are attached to a light insulating plate 16, which may form a part of the record card controlled machine represented by 17. Six output light guides are provided, four (1, 2, 4, 8) to develop the binary code and two other (X, 0) for developing control pulses, particularly for use in programming.

During each passage of the record card between a light source and the light tube matrix, light beams are passed through one or more perforations and translated into a code, in this case binary, that can be easily processed by the electro-optical data processing system. Actually perforated tapes and other data bearing records as well as punched cards may be used to modulate beams of light entering the data processing system. An alternative possibility is the application of electrical input signals that are converted into light signals by means of cathode ray tubes, gaseous discharge devices or shutters. Nor is it beyond the realm of possibility of employing records in the form of reflective surfaces or transparencies, with flying spot signals or other control light sources being used to scan the information.

Figure 2:
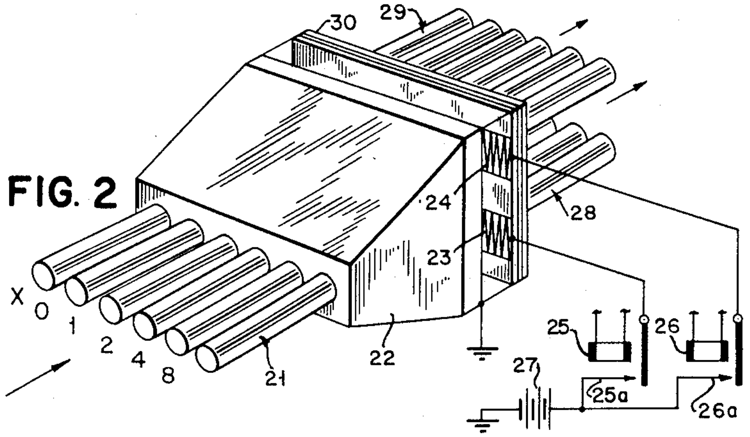
Fig. 2 illustrates an electro-optical switch.

Fig. 2 illustrates one type of electro-optical switch that may be used in the data processing system according to the invention. The six input light guides 21, which correspond to the six output ends of the light pulse translator illustrated in Fig. 1, are connected directly to a tapered transparent chamber 22. The tapered chamber 22 spreads the light pulses channeled by tubes 21 over a large vertical area so that each light pulse received by the tapered chamber 22 strikes a grounded photoemissive surface and the developed electrons are then projected across a certain width of both phosphor strips 23 and 24 on electrical insulating support 30. The two phosphor strips 23 and 24 are electrically connected to a pair of relay contacts, with strip 23 being connected to relay contact **25*a* and strip 24 being connected to relay contact 26*a*. When one or both of the relays 25 and 26 are energized, the closure of their corresponding contacts connects phosphor strips 23 and 24 to the positive side of D.C. source 27. The potential thus applied to phosphor strips 23 and 24 determines the operation of said strips and the transfer of light pulses to output guides 28 and 29**.

Although six output guides 28 and 29 are shown connected to phosphor strips 23 and 24 respectively, it is understood that any number of guides may be connected to said strips in accordance with the desired design. Similarly any number of phosphor strips, each representing a switching position, may be employed. Of course, additional strips will require additional groups of output tubes like 28 and 29.

Such a light pulse switch is capable of selectively channeling input light pulses to one or both groups of output light guides in accordance with the particular address in the data processing system. Assuming that a binary 7 is presented to the switch, the input guides 21 will channel the light pulses in light guides 1, 2 and 4 into the tapered chamber 22 for electron conversion and then for impingement across a certain area of both phosphor strips 23 and 24. If at this time relay 26 alone has been operated, the electron pulses arriving at phosphor strip 24 will cause illumination of an area of said strip asociated with three of the guides 29 that carry the 1, 2 and 4 representing light pulses. Since relay 25 is not energized at this time, the phosphor strip 23 is incapable of being illuminated by the light pulses coming from tubes 21 because contacts **25*a* are open and bar the application of positive potential to the phosphor strip. However, should relay 25 be energized, then of course contact 25*a* would close to make it possible for phosphor strip 23 to pass the light pulses through to appropriate ones of guides 28**.

Figure 3:
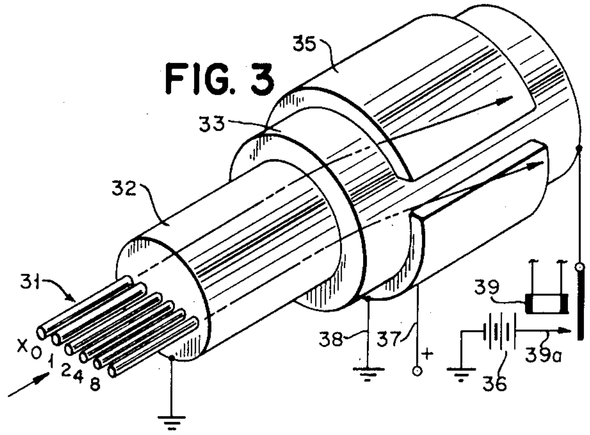
Fig. 3 illustrates an electro-optical deflector.

Fig. 3 illustrates one type of electro-optical deflector that may be used in the disclosed data processing system. The purpose of such a deflector is to deflect the input data representing the light pulses so that each group of such pulses will be stored on different surface areas of a storage chamber, which will be subsequently described. As shown in Fig. 3, six input light guides 31 are connected to the photoemissive input surface of cylinder 32, which in turn is connected to a larger cylinder 33. Surrounding cylinder 33 is a deflection coil 35, with its lines 37 and 38 connected to a potential source and ground respectively. D.C. source 36 is connected through contacts **39*a* to the phosphor screen of output cylinder 33 whenever relay 39** is energized.

In operation the light pulses are entered through input guides 31 and projected onto the photoemissive input surface of cylinder 32 producing a burst of photoelectrons that are accelerated to the phosphor output surface of cylinder 33. When a potential is applied to line 37 the photoelectrons developed by the light pulses that enter through input tubes 31 are deflected in cylinder 33 and fed to different phosphor areas. By varying in steps the positive voltage applied to lead 37 of the deflection coil 35, it is possible to deflect the photoelectrons so that the light pulses will impinge on different areas of the output phosphor screen. The affected phosphor areas will be illuminated provided relay 39 is energized at the time. Lenses or light guides (not shown) may serve to carry the light pulses emitted by the phosphor screen. The electro-optical deflector is capable, in effect, of deflecting light pulses in a manner similar to cathode ray tube deflection. Of course, a greater or lesser number of input tubes may be used to accommodate a desired number of light pulses for processing.

Fig. 4 illustrates a typical ionization storage device that may be used for the storage of data representing light pulses in the disclosed electro-optical data processing system. Such a device comprises an input glass plate 41 attached to which is an electrode 42, which has a photo-emissive surface 43. Opposite the photo-emissive surface 43 is a phosphor screen 44, the photo-emissive surface 43 and phosphor screen 44 being separated by a chamber 45 filled with a gas mixture, preferably nitrogen-argon. The phosphor screen 44 is located on one side of electrode 46 and a glass plate 47 is found on the other side of electrode 46. The input electrode 42 is electrically connected to the positive side of D.C. source 48, which may be from 600 to 1000 volts potential. The output electrode 46 is connected through a relay contact **49*a* to the negative side of D.C. source 48**. The arrow indicates the direction of data input into storage.

In operation the data representing light pulses that are applied at the input side of the storage chamber energize selected portions of the photoemissive surface 43. Assuming that relay 49 is not energized and contacts **49*a* are in their closed condition, a difference of potential will exist between the electrodes 42 and 46, and small zones of gas in chamber 45 will be ionized when the light beams are received by the photoemissive surface 43 developing electrons that ionize the gas and cause the ions to bombard the phosphor screen 44. In this way, the illuminated and dark dots, representing a binary "1" and "0," respectively, are formed on the phosphor screen 44. The ionization pattern developed by the input light pulses is maintained by the potential applied between the electrodes. With the potential applied, the strong blue-ultraviolet radiation of the ionized zones will continue to excite the phosphor area indefinitely. To terminate the discharge and thus to erase the data stored in the ionization chamber, it is only necessary to energize relay 49**.

Figure 5:
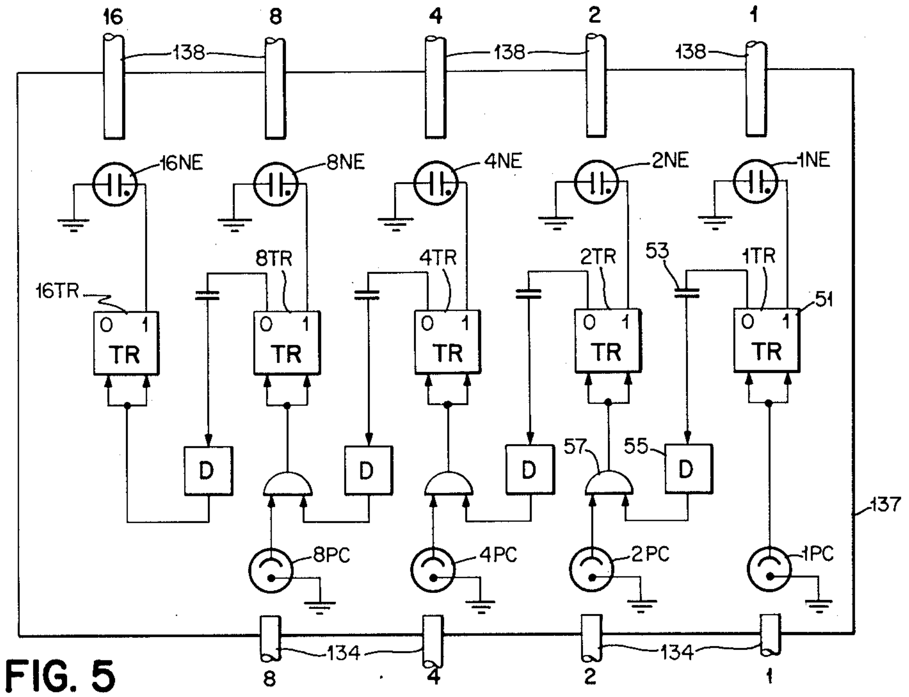
Fig. 5 illustrates an electro-optical binary accumulator.

Fig. 5 illustrates an electro-optical accumulator that may be employed in the disclosed data processing system. Generally such an accumulator consists of electrically and optically interconnected radiation responsive elements within each accumulating stage and between the various stages.

The actual structural arrangement of the accumulator 137 forms no part of the present invention, and the arrangement shown in Fig. 5 and described subsequently is exemplary only.

Input light pulses supplied through light guides 134 generate electrical signals by means of associated photoconductors, which electrical signals are supplied to an arrangement of triggers or other bistable devices, the arrangement being of the type shown in Fig. 4–19 of "Arithmetic Operations in Digital Computers," by R. K. Richards, published by D. Van Nostrand Company, Inc., copyright 1955. The "on" output of the triggers is supplied to an associated neon lamp or other light generating means, which in turn is associated with one of the output light guides 138.

Each of the stages is substantially identical, and includes a trigger such as 1TR, 2TR, 4TR, 8TR and 16TR, which may be electronic or electro-optical and is arranged so that successive electrical input pulses supplied thereto either from the assoiated input photoconductors, such as 1PC, 2PC, 4PC and 8PC, or from the next lower stage via an OR circuit such as 57, will cause the triggers to alternate between their two stable states, and hence provide an output at either the "0" side or the "1" side, which output remains effective until the trigger switches to the opposite state.

The output from the "1" side of each trigger is supplied to an associated light source, such as the neon lamps 1NE, 2NE, 4NE, 8NE and 16NE, so that when a binary "1" value is stored in any stage, the associated neon lamp will supply light to the associated one of the output light guides 138.

The output from the "0" side of each trigger is supplied through a capacitor such as 53, a delay device such as 55 and through an OR circuit such as 57 to the input of the trigger in the next higher stage. If it is assumed that the triggers are operated by positive-going pulses, it can be seen that when a trigger goes to its off or "0" stage, a momentary inpulse, delayed by a predetermined time interval, will be supplied to the next higher stage.

It can be seen therefore that successive inputs to any one stage will cause alternate "1's" and "0's" to be stored, the "0's" also propagating a carry pulse to the next higher stage.

The delay in the carry line is for the purpose of permitting any necessary changes in state of the triggers to take place following the input signals, before the carry signals are supplied thereto. The data supplied to the accumulator is spaced by intervals sufficiently long to permit a carry signal to "ripple" through all stages, if necessary.

Considering an actual numerical operation, let it be assumed that three numbers are to be read out of data storage 126, supplied to the accumulator, and the result then stored in data storage 126. Let it be further assumed that there are four binary orders in the input data position (8, 4, 2, 1) as shown in Fig. 5, with a maximum decimal value of fifteen, and that the accumulator data storage and output devices are to have an output capacity of twice the input capacity, that is decimal 30. Under these conditions the input data light guides 134 would be four in number with binary values 8, 4, 2 and 1. The output light guides 138, the accumulator stages, the data storage locations in storage 126, and the storage output light guides 131 would each be five in number, with binary values 16, 8, 4, 2 and 1, which thus can handle numbers up to decimal 32.

If three binary numbers 0111 (decimal 7) for example, are stored in successive locations in data storage 126, they may be read out in succession to the accumulator in the manner described previously. The first binary number will cause the first three stages of the accumulator to operate in the manner previously described so that the first three output means, 1NE, 2NE and 4NE are lighted. The illumination of the output guides during the entire accumulating operation will have no effect, since the input data deflector 124 is de-energized, preventing the outputs from the accumulator in light guides 138 from entering data storage device 126.

When a second binary number 0111 is supplied to accumulator 137, each of triggers 1TR, 2TR and 4TR is turned "off." However, after the delay period, triggers 2TR, 4TR and 8TR will be turned on in the succession named by the delayed carry pulses. Sufficient time between successive groups of light pulses is allowed to permit propagation of carries from the lowest order to the highest order, if such carries are required. When 0111 is added to 0111, carry pulses are generated by the first three stages so that following termination of the input pulses, and after carry propagation time the neon lamps at output positions 8, 4 and 2 are lighted and the lamp at 1 position is dark indicating a standing sum of 1110 or decimal 14 (7+7). As previously stated, these outputs are not entered into storage during the accumulating cycle.

When a third binary number 0111 (decimal 7) is supplied to the inputs of the accumulator, the first stage will be turned on, with no carry. The second stage will be turned off, with a carry to the third stage, so that, even though an input is supplied to this stage effective to turn it off, the ensuing carry pulse from the second stage will turn it on, and also cause initiation of a carry pulse to the fourth stage.

The fourth stage, which is on, receives no input pulse, but the carry pulse from the third stage will turn it off.

The fourth stage will propagate a carry pulse to the fifth stage, so that the fifth stage is turned on by this carry pulse. The output of the accumulator will accordingly read 10101 (decimal 21).

The final sum is read into data storage 126 by energizing deflector 123 and its deflecting coil 124 in the manner previously described.

*Description of system*

The electro-optical devices of Figs. 1–5 are electrically and optically interconnected to form the novel data processing system illustrated in Figs. 6*a* and 6*b*. Data-representing light pulses are initially developed at an optical reading station represented by light source 111 and lens 112 during the passage of a record card 113 from a feed hopper 114 to a stacker 115 of a record card controlled machine. The mechanical elements which serve to transfer record cards from the feed hopper to the stacker are conventional and are therefore not shown in Fig. 6. The light pulse translator 116 which receives said light pulse from light source 111 converts them to a form suitable for use in the data processing system. In the present case the decimal digit representing light pulses developed by the perforated card 113 are converted into binary digit-representing light pulses before being delivered to electro-optical switch 117, which corresponds to the switch of Fig. 2.

Electro-optical switch 117 has two sets of output light conducting guides 118 and 119. The phosphor strip of switch 117 that is associated with the light-conducting tubes 118 is connected via resistor 120 and relay contacts 209*a*, to the positive side of D.C. source 121. Therefore, this phosphor strip is energized whenever relay contacts 209*a* close for the purpose of transferring the data representing light pulses from light pulse translator 116 to light guides 118.

Light guides 118 channel the data representing light pulses made available by switch 117 to deflector 123, where said light pulses are converted to photoelectrons that are then shifted in said deflector in accordance with a magnetic field developed by deflection coil 124.

It may be seen that deflection coil 124 of the input deflector 123 is connected through the deflection coil 130 of the output deflector 129 to one side of a group of seven normally open relay contacts. Thus when relay coil 151 is energized, its corresponding contact 151*a* closes to form a complete circuit from deflection coil 124 through resistor 158 to the positive side of D.C. source 121. When the next relay coil 152 in sequence is operated, its corresponding contact 152*a* closes to connect resistor 159 to deflection coil 124. The same applies with regard to relay coils 153—157 which connect resistors 160—164 respectively to deflection coil 124 for the purpose of deflecting the data representing photoelectrons within the input deflector 123.

The photoelectrons that are deflected by deflection coil 124 in deflector 123 to the output phosphor face of said deflector are converted back to light pulses and transferred through lens 125 to the surface of storage device 126 only when relay contact 210*a* closes a path from the output phosphor face to D.C. voltage source 127. It should be noted that light guides could also serve to transfer the light pulses from deflector 123 to storage device 126.

The light pulses projected from the input deflector 123 are stored in storage device 126, provided that the normally closed contact 211*a* is closed. The closed contact 211*a* directly connects the input electrode of the storage device 126 to the positive side of D.C. source 121. The output electrode of storage device 126 is connected to ground, as is the negative side of voltage source 121. As explained above with regard to Fig. 4, when a positive potential is applied to the input electrode light pulses may be stored in the ionization chamber 126. To erase the information in storage, it is only necessary to open contact 211*a*, thereby disconnecting the input electrode of storage device 126 from D.C. source 121.

Readout of information from storage is shown being accomplished by lens 128 and output deflector 129, whose input face is grounded. Output selection is accomplished in deflector 129 as a result of the application of a stepping potential across deflection coil 130, as already discussed above with regard to coil 124 of deflector 123. The data present in deflector 129 is automatically channeled through light guides 131 to electro-optical switch 132.

Output switch 132 channels the data representing light pulses made available to it by deflector 129 to one or both sets of light guides 133 and 134. Switch 132 channels the light pulses to light guides 134 whenever the phosphor strip associated with guides 134 is energized through resistor 135 by the closure of relay contact 213*a*. The phosphor strip and resistor 135 are connected to the positive side of D.C. source 121 when contact 213*a* is closed. In the same way, switch 132 channels the data representing light pulses to light guides 133, whenever the phosphor strip associated with said light tubes is connected through resistor 136 and relay contact 214*a* to the positive side of D.C. source 121.

Data representing light pulses channeled by guides 134 to the electro-optical accumulator 137 are accumulated and then manifested by the energized phosphor elements representing the accumulated values, as described with regard to Fig. 5. The value manifested in accumulator 137 by the output phosphor elements is projected automatically to light guides 138, which channel the value representing light pulses to deflector 123. These value representing pulses will be made available to storage device 126 if the output phosphor face of deflector 123 is connected to D.C. source 127 at this time.

The light pulses that are delivered to light guides 133 are made available to a suitable conversion device 141 (Fig. 6*b*) which translates the input light pulses into output electrical pulses. Six guides 133 and six associated conventional photoconductors 201 are shown in conversion device 141, although it must be understood that any number of guides 133 and associated photoconductors 201 may be used. Each photoconductor is connected to the grid of a conventional cathode follower 142 and through a resistor 229 and common resistor 232 to the positive side of a D.C. source 230.

The light pulses in any of the guides 133 cause corresponding photoconductors in conversion device 141 to be energized, making the corresponding cathode followers conductive. The electric pulses developed by the cathode followers 142 may operate directly an output device 231 such as a printer or punch for permanently recording the processed data. In the case of binary digit representing electric pulses developed by the cathode followers 142, they may be converted into decimal form by a suitable binary-to-decimal converter before being recorded in permanent form.

As soon as data is read out from storage and entered into converter 141, a positive potential is developed across common resistor 232. This condition operates cathode follower 233 which controls the operation of an output device 231 such as a punch or printer, and multivibrator 223. Multivibrator 223 in turn operates cathode follower 224, which energizes relay 221 for the purpose of controlling the stepping action of program counter 218 by pulse generator 220.

The programming section of the data processing system employs electro-optical devices similar to those described above in the case of the computing section. The information representing light pulses made available to switch 117 by translator 116 are switched to light guides 119 whenever relay 227 is energized. The program phosphor strip on switch 117 is composed of two electrically isolated sections, one of which controls the operation of relay 227. The program control phosphor strip, for example, may represent an area adequate to be energized by light pulses developed in the "X" or "0" light tubes of translator 116. This lesser phosphor strip is connected via resistor 143 to the positive side of D.C. source 121. Thus when the optical scanning of record material 113 develops a light pulse in either light tube "X" or "0" of translator 116, a voltage is developed across resistor 143 and fed to the control grid of cathode follower 234. Conduction of cathode follower 234 develops the necessary pulse for energizing relay 227.

The larger program phosphor strip of switch 117 is connected through resistor 122 and relay contacts 227*a* to the positive side of D.C. source 121. Therefore, the closure of relay contact 227*a* permits the complete program represented by the light pulses in translator 116 to be switched to tubes 119. The program light pulses are channeled by guides 119 to input program deflector 144 for possible deflection after conversion to photoelectrons under control of deflection coil 145. Then the light pulses are projected by lens 146 into storage device 147. The program will remain in storage so long as relay contact 212*a* remains closed. Relay contact 212*a* connects the input electrode of storage device 147 to the positive side of D.C. source 121. The output electrode of storage device 147 is grounded. To erase the program in storage it is only necessary to energize relay 212 (Fig. 6*b*).

After the program is stored, it is then automatically made available through lens 148 to output deflector 149, and transferred therefrom, provided that relay contact 228a remains in its normally closed condition. Contact 228a serves to provide a direct connection between the output phosphor face of deflector 149 and the positive side of D.C. source 127. Selection of the output light pulses within output deflector 149 is accomplished by deflection coil 150.

Both deflection coils 145 and 150 associated with the input deflector 144 and output deflector 149 respectively are series connected through a parallel set of stepping resistors 172—178 to the positive side of D.C. source 121. One side of each of the resistors is connected to the deflection coils through normally open relay contacts 165a—171a of relays 165—171. Of course, with all the relay contacts open, no potential is applied to the deflection coils 145 and 150 and no deflection occurs in deflectors 144 and 149. The energization of each of the relays 165—171 causes a stepping potential to be applied across deflection coils 145 and 150 for the purpose of deflecting the photoelectrons developed by the program light pulses in the two deflectors 144 and 149 respectively.

The program light pulses are then delivered by the output deflector 149 to a plurality of light guides 182, which channel the light pulses to a multielement converter 183 (Fig. 6b) which is like converter 141 discussed above. A number of photoconductor elements 215, each electrically isolated from the other, are connected directly to respective grids of conventional cathode followers, and through identical resistors 184 to the positive side of D.C. source 121. Therefore, a program representing light pulse delivered by a guide 182 to the associated one of the photoconductors of converter 183 develops a positive pulse at the control grid of a corresponding cathode follower, thereby operating said tube and developing a control voltage for operating a relay circuit in the data processing system.

For example, a light pulse made available to the photoconductor connected to the grid of cathode follower 185 causes said cathode follower to develop a pulse for energizing relay 154. The closure of corresponding relay contact 154a develops a potential of one order of magnitude across deflection coils 124 and 130. Cathode followers 186—188 energize the other relay coils 151—153 respectively in the same manner and for the same purpose of deflecting the data representing light pulses in deflectors 123 and 129. The other relays 155—157 could also be energized by similar cathode follower arrangements, provided the necesary connections were made.

Cathode followers 189—200 serve to operate relays 203—214 (Fig. 6b). When cathode follower 189 is made conductive, relay 203 is energized, operating its corresponding contact 203a which closes a circuit from timing pulse generator 217 through contact 203a to data counter 219, whose function will be subsequently explained. Similarly, when cathode follower 190 is operated, relay 204 is energized to close its corresponding contact 204a. The closure of this contact connects single pulse generator 220 to data counter 219.

The operation of cathode follower 191 energizes relay 205, thereby closing its corresponding contact 205a. The closure of this contact connects the timing pulse generator 217 through normally closed relay contact 221a to data counter 219. Relay 221 is energized whenever the electro-optical switch 132 is energized by D.C. source 121 for the purpose of switching digit representing light pulses read out from storage to the accumulator 137. The application of such voltage to switch 132 at the same time that light pulses are entered into switch 132 automatically operates a conventional monostable multivibrator 223, which in turn makes cathode follower 224 conductive to energize relay 221. This results in the opening of contact 221a and the closing of contacts 221b. In this way the program counter 219 is stepped along one position.

Returning to Fig. 6b, the operation of cathode follower 192 energizes its associated relay 206, which closes its contact 206a for the purpose of making available an electric pulse from pulse generator 220 through normally closed contact 221a to data counter 219. Of course, when contact 221a is opened during the time that data is being entered into the accumulator 137, counter 219 cannot receive a pulse through relay contact 206a from pulse generator 220.

Thus it is seen that the operation of counters 218 and 219 is controlled by the setting of a number of relay contacts whose operation is ultimately controlled by the program representing light pulses stored in storage device 147. Counters 218 and 219, which may take any electrical or electronic form, each have seven outputs for the purpose of energizing the stepping relays in the program and data sections of the disclosed processing system. Program counter 218 has each of its seven output conductors a–g connected to a different one of the program relays 165—171 for operating said relays in a stepping sequence. Data counter 219 has its seven output terminals a–g connected to stepping relays 151—157. For example, when pulses developed by the timing pulse generator 217 are made available, as a result of the particular program, through relay contact 205a to data counter 219, said counter is stepped through its seven positions and develops pulses for relays 151—157 for the purpose of reading a particular sequence of digits into and out of a particular area of storage device 126.

Returning to the conversion of program representing light pulses into electrical control signals, the operation of cathode follower 193 brings about the energization of relay 207 which closes corresponding contact 207a. This has the effect of connecting the control line of data counter 219 to ground for resetting said counter.

In the case of the energization of cathode follower 194, relay 208 is energized, closing its corresponding contacts 208a. This serves to connect the control line of the program counter 218 to ground, thereby resetting said counter.

The operation of cathode follower 195 brings about the energization of relay 209 which closes contact 209a. In this way the positive side of D.C. source 121 is connected through resistor 120 to switch 117 and the input of cathode follower 236. In this way input data is switched to the processing system and the data counter is operated.

When the particular program causes cathode follower 196 to be operated, relay 210 (Fig. 6b) is energized and its corresponding contact 210a (Fig. 6a) is closed. This has the effect of connecting the positive side of D.C. source 127 to the phosphor face of deflector 123 for the purpose of allowing the light pulses at the output of said deflector to be transmitted to storage device 126.

The operation of cathode follower 197 energizes relay 211 thereby opening its corresponding contact 211a. When it is desired to erase the contents in data storage device 126, relay 211 is energized to disconnect the positive potential from the input electrode of storage device 126. Cathode follower 198 performs the same function with regard to the erasure of a program in storage unit 147. In such a case relay 212 is energized.

Operation of cathode follower 199 by the corresponding input photoconductor of converter 183 causes the energization of relay 213. This brings about the closure of contact 213a which provides a control voltage for switch 132. In the same way the operation of cathode follower 200 brings about the energization of relay 214, which closes its corresponding contact 214a to apply a positive control voltage to the other photoemissive strip of switch 132. The voltage provided by D.C. source 121 through contact 214a permits data representing light pulses to be delivered through light tube 134 to accumulator 137.

Another part of the control system of the disclosed electro-optical data processing system is provided by cathode follower 234, which provides a control voltage that operates simultaneously relays 226, 227, 228 (Fig. *6a*). The operation of relay 226 closes its corresponding contact 226*a* to form a complete path between timing pulse generator 217 and the program counter 218. In this way, the timing pulse generator 217 will operate counter 218 despite the fact that control relays 203 and 204 are de-energized. Operation of relay 227 permits the program representing light pulses to be entered into the program section of the processing system. At the same time relay 228 is energized to open its corresponding contacts 228*a*. This has the effect of removing operating potential from the output surface of deflector 149, thereby cancelling the flow of program light pulses to the electro-optical converter 183 until the entire program has been entered into storage.

*Operation*

The operation of the data processing system of Figs. *6a* and *6b* will now be discussed in conjunction with the timing diagram of Fig. 7. Initially it must be understood that the counters 218 and 219 are reset and that the required program in the form of light pulses must first be entered into program storage. The program representing light pulses are developed by light entering perforations on record card 113 as said card is moved from hopper 114 to stacker 115. The program light pulses are then channeled by translator 116 to switch 117. The presence of a program control pulse brings about the operation of tube 234, which energizes relays 226—228. The closure of contact 226*a* causes program counter 218 to be moved to its first position by timing pulse generator 217. The closure of contact 227*a* permits the entry of the program light pulses into storage device 147. Relay contact 228*a* is opened simultaneously to prevent output deflector 149 from transferring any program light pulses to converter 183.

When the program counter 218 is in its first position, the voltage made available at output terminal 218*a* energizes relay 165 and brings about the closure of its corresponding contact 165*a*. This establishes a potential across deflection coil 145 to permit the next group of program representing light pulses that are entered into deflector 144 to be stored on the next succeeding horizontal line of storage device 147. As long as relay 226 is energized and its corresponding contact 226*a* closed, the program counter will continue to be stepped along. This energizes a different one of the stepping relays 165—171 to provide a different potential across deflection coil 145 to guarantee the storage of the program on a different horizontal line of storage surface 147. Since the counter 218 is shown with only seven output terminals and there are only seven stepping relays in Fig. *6a*, the maximum program word storage in the illustrated system is seven, although it must be understood that any number of stepping voltages for deflection coil 145 may be developed by increasing the size of the counter and the number of relays.

Reference to Fig. 7 will show that relay contacts 226*a* and 227*a* remain closed and relay contact 228*a* remains open for a duration determined by the length of the particular program entry.

After the last program word has been read into the program section of the processing system, the cathode follower 234 senses the absence of a program entry, and immediately de-energizes relays 226—228. The last program word calls for the resetting of the program counter 218. Therefore, when relay 228 becomes de-energized, the last program word is automatically read out of program storage and delivered to converter 183 which converts it into an electric signal for operating cathode follower 194. Relay 208 is then energized, closing its contact 208*a* (Fig. 7) and thereby resetting program counter 218. With the program counter 218 in its starting position and relay contact 228*a* closed, the first program word stored in storage device 147 is read out by deflector 149 and channeled by guides 182 to the electro-optical converter 183. The first program word must necessarily set up the conditions in the processing system for the entry of data into storage. Therefore, the program representing light pulses of the first stored program word will be converted into electrical pulses by converter 183 for the purpose of operating cathode followers 195 and 196 which in turn energize relays 209 and 210 respectively. The closure of relay contact 209*a* operates switch 117 in a manner to allow the data representing light pulses to enter deflector 123. The closure of relay contact 210*a* applies a positive potential to the output surface of deflector 123, thereby permitting the data representing light pulses which now enter the deflector to be projected to storage device 126. Reference to Fig. 7 will show that during the time that the data is being stored only relay contacts 209*a*, 210*a*, 211*a*, 212*a*, 221*a* and 228*a* remain closed.

The data counter 219 is stepped along by cathode follower 236 each time a data word is entered into the processing system. The output pulses developed by counter 219 will operate different ones of the relays 151—157 to provide a stepping voltage for deflection coils 124 and 130. This will permit each data word entered into input deflector 123 to be projected to a different horizontal level of storage device 126, this process of storage continuing until all data words are entered into storage. Entry into the accumulator at this time cannot be accomplished because relay contacts 213*a* are open.

The last data word is entered along with a program control pulse in either or both guides "0" and "X," as previously described. In this way the program counter is moved to the next position. The second program word must provide for the accumulation of the stored data, as indicated in step 3 in Fig. 7. Therefore, cathode followers 191 and 200 are operated to energize relays 205 and 213, respectively.

The closure of contact 205*a* will permit data counter 219 to be advanced by pulses provided by timing generator 217. Counter 219 will again operate relays 151—157 in a stepping fashion to enable sequential readout of the data previously entered in storage chamber 126. The data sequentially read out from storage as a result of the operation of counter 219 is now permitted entry into the accumulator. The accumulated values are then automatically delivered via feedback guides 138 to the input deflector 123. However, since relay contact 210*a* is open at this time (see Fig. 7), the output face of deflector 123 is not connected to D.C. source 127 and, therefore, the data representing light pulses that reach deflector 123 cannot be eventually entered into storage device 126.

After the last value has been read out of storage by deflector 129 and delivered through switch 132 to accumulator 137, the switch 132 senses the absence of light pulses. Multivibrator 223 drives cathode follower 224 into a state of conduction for the purpose of energizing relay 221. This brings about the closure of relay contact 221*b* and the opening of relay contact 221*a*. Timing pulses cannot now be delivered to counter 219, and therefore, further stepping of this counter cannot be accomplished. At the same time the closure of contact 221*b* advances counter 218 to the next position for the purpose of switching the next succeeding program word in storage to the electro-optical conversion device 183 (Fig. *6b*). The third program word calls for storing the total developed in the accumulator. Therefore, cathode followers 190, 192 and 196 are made conductive to energize corresponding relays 203, 206 and 210 respectively.

The closure of relay contact 206*a* permits a pulse to be delivered by pulse generator 220 to data counter 219 for the purpose of stepping said counter one position.

Reference to Fig. 7 will show that relay contact 221a is closed at this time. The closure of relay contact 210a, which connects positive potential to the output surface of input deflector 123, allows the total value present in accumulator 137 to be projected by deflector 123 onto an area of the storage surface 126 controlled by data counter 219. The total that is thus entered into storage is prevented from being read out of storage and entered into accumulator 137 because of open relay contact 214a (see Fig. 7). The closure of relay contact 203a causes counter 218 to be stepped along to its next program position.

Assume that the next program word is to reset data counter 219. In such a case relay 207 is energized, closing its corresponding contact 207a, which has the effect of resetting the counter 219. Reference to Fig. 7 will show that during this time interval relay contact 203a is also closed in order that the program counter 218 might be stepped along to its next position by the timing pulse.

The succeeding program word in the present example calls for the conversion of the stored total into electrical pulses for the purpose of operating a desired output device (see Fig. 7). This program word will bring about the energization of relays 205 and 214. The closure of contact 214a operates switch 132 in a manner to allow the stored total read out from storage device 126 by deflector 129 to be channeled by guides 133 to electro-optical converter 141, which converts said data representing light pulses into corresponding electrical pulses. The electrical pulses so developed energize corresponding cathode followers 142 which may control the operation, for example, of suitable electro-magnetic devices (not shown) for operating a desired output device such as a printer or punch. The closure of relay contact 205a causes data counter 219 to be stepped along to its next succeeding position.

The end of the readout cycle is sensed by cathode follower 233, which operates multivibrator 223 and then makes cathode follower 224 conductive. Relay 221 is thus energized to open its contact 221a and closes its contact 221b. The closure of contact 221b permits the pulse generator 220 to move the program counter 218 one position. The last program step resets the electro-optical processing system and cancels the stored data. Relay contacts 207a and 208a are closed to reset counters 219 and 218, respectively. Relay contact 211a is opened to erase the information in storage device 126. The program in storage at this time is not erased because of contemplated future use. The hypothetical operation cycle is completed, and the electro-optical processing system is in readiness for the next operation cycle.

While the invention has been particularly shown and described with reference to a preferred embodiment thereof, it will be understood by those skilled in the art that various changes in form and details may be made therein without departing from the spirit and scope of the invention.

What is claimed is:

1. A computer for digit representing radiant energy pulses comprising optical sensing means for developing digit representing light pulses, electro-optical storage means, first electro-optical means for reading said digit representing light pulses into various areas of said storage means, second electro-optical means for reading out said stored light pulses, and electro-optical means for accumulating values read out of storage, said accumulating means being optically connected to said first means for the purpose of storing accumulated values.

2. An electro-optical computer in which perforations in a record material are optically sensed and translated into digit representing light pulses, comprising means for channeling said digit representing light pulses, means for switching said light pulses into various sections of the computer, storage means, readin means connected to said switching means for reading the digit representing light pulses into various locations of said storage means, means similar to said readin means for reading out from storage, means for accumulating the digit representing light pulses read out from storage, with said accumulating means and said readin means being optically connected for subsequently channeling the accumulated values to said storage means.

3. An electro-optical computer for processing digit representing light pulses developed by an optical scanning system during the passage of a perforated record in a record card controlled machine, comprising means for translating the digit representing light pulses into a suitable code, means for channeling said coded light pulses, first switching means for switching the channeled pulses to various sections of the computer, first deflecting means connected to said first switching means for shifting the coded light pulses, storage means, means for projecting the deflected light pulses to different sections of said storage means, second deflecting means, means for projecting the stored digit representing light pulses to said second deflecting means, accumulating means, means for converting digit representing light pulses to digit representing electrical pulses, means for switching the digit representing light pulses deflected by said second deflecting means to either or both said accumulating means and said converting means, means for channeling the accumulated digit representing light pulses to said first deflecting means, with said converting means being capable of operating a utilization device, whenever digit representing light pulses are made available to it by said second switching means.

4. A record card controlled computing system for handling digit representing light pulses comprising means for channeling said digit representing light pulses, first means for switching said channeled light pulses to various sections of the computer, first deflecting means, means for channeling digit representing light pulses from said first switching means to said first deflecting means, storage means, first optical means for projecting the digit representing light pulses at the output of said first deflecting means to different areas of said storage means, second deflecting means, second optical means for projecting the digit representing light pulses in storage to said second deflecting means, accumulating means, means for converting the digit representing light pulses into digit representing electric pulses, second switching means for switching the digit representing light pulses present in the second deflecting means to either or both said accumulating means and said converting means, with said converting means controlling the operation of a utilization device.

5. An electro-optical computer comprising means for developing decimal digit representing light pulses, means for converting said decimal digit representing light pulses into binary digit representing light pulses, storage means, readin means for reading said binary digit representing light pulses into different areas of said storage means, means for reading out said binary digit representing light pulses from said storage means, and means for accumulating the read out binary digit representing light pulses, with said accumulating means and said readin means being interconnected so that the accumulated binary values may be stored for future operations.

6. A record card controlled computing system in which data representing light pulses are initially developed by an optical scanning arrangement during the passage of a perforated record material from a magazine to a stacker in a record card controlled machine, comprising a light guide translator for converting the digit representing light pulses into a suitable code, a first electro-optical deflector, a first multiposition electro-optical switch for switching said coded pulses to said first deflector, an ionization storage member, a first optical element for projecting said coded pulses from said first deflector to said storage member, a second electro-optical deflector, a second optical element for projecting the stored values to said second deflector, an electro-optical accumulator, an electro-optical converter, a second electro-optical switch for transferring the coded pulses from the second deflector to said accumulator and/or said converter, with said converter being capable of converting the coded light pulses received from said second switch into coded electrical pulses for the purpose of operating a utilization device.

7. The invention according to claim 6, in which light transmitting guides serve to channel the light pulses between the electro-optical devices.

8. A record card controlled computing system in which digit representing light pulses are initially developed by an optical scanning arrangement during the passage of a perforated record material from a magazine to a stacker, comprising means for converting decimal representing light pulses into binary representing light pulses, first means for switching said light pulses to various sections of the computer, storage means, first deflecting means directly connected to said first switching means for deflecting the digit representing light pulses onto different areas of said storage means, means for reading out light pulses from storage, a second switching means, means connected to said second switching means for accumulating the digit representing light pulses read out of storage, means for channeling the accumulated values to said first deflecting means, means connected to said second switching means for converting the digit representing light pulses read out from storage into digit representing electrical pulses for the purpose of operating a utilization device.

9. An electro-optical computer comprising means for optically reading data from record cards and developing program or data representing light pulses, means connected to said reading means for channeling said program or data representing light pulses, means for switching said pulses, program and data storage means, means optically connected to said switching means for entering the channeled pulses at selected locations of said storage means, means optically connected to said storage means for reading out the program or data from said program or data storage means, means for accumulating the data representing light pulses read out from data storage, means for converting the program representing light pulses into electric pulses, and means operated by said electric pulses for controlling the processing of the data representing light pulses.

10. An electro-optical computer comprising means for developing program and data representing light pulses, means for converting said program and data representing light pulses into suitable program and data coded light pulses, electro-optical data storage means, electro-optical program storage means, means for switching said program representing coded light pulses to said program storage means and said data representing coded light pulses to said data storage means, means for accumulating the stored data representing coded light pulses, means for returning said accumulated coded light pulses into data storage, and means for converting the stored program coded light pulses into corresponding electric control pulses for the purpose of controlling the operation of all electro-optical devices of said computer in accordance with the stored program.

11. An electro-optical computer comprising means for developing information representing light pulses, means for converting said information representing light pulses into suitable data and program light pulses, electro-optical data storage means, electro-optical program storage means, electro-optical means for switching said data light pulses into said data storage means and said program light pulses into said program storage means, electro-optical accumulating means, electro-optical data conversion means for controlling the operation of a utilization device, means for switching the stored data to said accumulating means and/or data conversion means, and an electro-optical program conversion means connected to said program storage means for converting the stored program light pulses into corresponding control voltages for the purpose of controlling the operation of all said electro-optical devices.

12. A computing system in which perforations in a moving record material are optically sensed and translated into suitable information representing light pulses, comprising a data storage means and a program storage means, a first means for switching the translated information representing light pulses to the program storage means or the data storage means, means connected with said data storage means for accumulating the data pulses, means for transferring the accumulated pulses back to data storage, a program conversion means connected to said program storage means for converting the stored program into control voltages for the purpose of controlling the operation of all said switching, storage and accumulating means, and counting means for controlling the entry of the data and program light pulses onto suitable locations of said data and program storage means.

13. A record card controlled computing system in which information representing light pulses are initially developed by an optical scanning arrangement during the transfer of a perforated record material from a magazine to a stacker, comprising means for converting said information representing light pulses into a suitable program and data light pulse code, first means for switching said data and program light pulses to various sections of the computing system, a data storage means and a program storage means, a first deflecting means for entering data representing light pulses into data storage, a second deflecting means for reading out the stored data, a means for accumulating data read out of storage, a third deflecting means for entering the program representing light pulses into program storage, a fourth deflecting means for reading out the stored program, and a conversion means for changing the program representing light pulses read out of storage into program representing electric pulses for the purpose of operating electrical circuits that control the processing of the data representing light pulses.

14. A record controller computing system in which decimal representing light pulses are initially developed by an optical scanning arrangement during the transfer of a perforated record material from a magazine to a stacker, comprising means for converting said decimal representing light pulses into data and program representing light pulses in the binary code, first means for switching said binary data and program light pulses to various sections of the computing system, a data storage means and a program storage means, a first means for entering binary data representing light pulses into data storage, a means for reading out the stored data, means for accumulating the data read out of storage, means for entering the binary program representing light pulses into program storage, means for reading out the stored program, data counting means for controlling the entry of binary data representing light pulses onto adjacent areas of said data storage means, and program counting means for controlling the entry of the binary program representing light pulses onto adjacent areas of said program storage means.

15. A record controlled binary computing system in which binary representing light pulses are developed by an appropriate input means, comprising a two-position electro-optical input switch for channeling said binary representing light pulses to either the data section or the program section of said computing system, a data storage means, an electro-optical input data deflector optically connected to said input switching means for projecting the binary data representing light pulses onto selected locations of said data storage means, an electro-optical output data deflector for reading out selected stored data, an electro-optical binary accumulator, an electro-optical device for converting said data representing light pulses into data representing electric pulses, an output switch optically connected to said output data deflector for channeling the stored data to either or both said accumulator and said data conversion device, an optical feedback means for channeling the output of said accumulator to said input data deflector, a program storage means, an electro-optical input program deflector optically connected to said input switch for projecting program representing light pulses to selected locations of said program storage means, an electro-optical program output deflector for reading out of program storage, an electro-optical device optically connected to said output program deflector for converting the stored programs into corresponding electric pulses, a data counter, a program counter, a switching device controlled by said program conversion device for controlling the stepping sequence of said data and program counters, with said data counter controlling the operation of both said input and output data deflectors and said program counter controlling the operation of said input and output program deflectors.

16. The invention according to claim 15 wherein the switching device controlled by said program conversion device includes a series of electromagnetic switches the operation of which provides appropriate potentials for operating selected ones of the electro-optical devices in said computing system in accordance with the converted program.

17. The invention according to claim 16 wherein both data and program counters are also controlled by said input switch, further comprising a switching device controlled by said data output switch for stepping said data counter each time stored data is entered into said accumulator.

18. The invention according to claim 17 further comprising two groups of switches with one group controlled by said data counter and the other group controlled by said program counter and wherein said input and output data and program deflectors include magnetic coils, the data and program switches providing a different potential across the data deflector coils and the program deflector coils for the purpose of controlling the selected readin and readout of data and program representing light pulses in the corresponding storage devices.

19. An electro-optical data processing system comprising input means for developing usable program and data representing light codes, a first electro-optical means optically connected to said input means for switching said light codes into various sections of said computing system, an electro-optical data storage means, an electro-optical program storage means, means optically connected between said first switching means and data storage means for reading the data representing light pulses into selected areas of said data storage means, means optically connected between said first switching means and said program storage means for reading said program representing light pulses into selected areas of said program storage means, an electro-optical means for accumulating said data representing light pulses, an electro-optical means for converting said data representing light pulses into data representing electric pulses, a readout means for said data storage means, a readout means for said program storage means, a second electro-optical means for switching the readout data representing light pulses to either said accumulating means or said data conversion means, electro-optical means for channeling the accumulated data values to said data storage means, electro-optical means connected to said program storage readout means for converting the stored program representing light pulses into program representing electrical pulses, means controlled by said electric pulses, a data counting means for controlling read in and read out from said data storage means, program counting means for controlling readin and readout from said program storage means, electric pulse forming means, with said program conversion means connecting said electric pulse forming means to either or both said counting means for the purpose of operating both said counting means and controlling the operation of all said electro-optical means in accordance with the stored program.

20. A record controlled data processing system in which perforations in a moving record material are optically sensed and translated into suitable program and data representing light pulses, first means for switching the translated information representing light pulses to various sections of the data processing system, a program storage means, a data storage means, means optically connected between said first switching means and said data storage means for entering the data representing light pulses into data storage, an accumulating means, means optically connected between said data storage means and said accumulating means for reading data out of storage, means optically connected between said first switching means and said program storage means for reading program representing light pulses into storage, conversion means for translating the program representing light pulses into program representing electrical pulses, means optically connected between said program storage means and said program conversion means for reading the program from storage, means for counting the number of groups of data representing light pulses entered into storage, means for counting the number of program representing light pulses entered into program storage, with both said data and program counters controlling the readin and readout of the stored data and program respectively.

21. A data processing system in which data and program information in the form of coded radiant energy pulses is processed, comprising input means for switching said coded radiant energy pulses, means optically connected to said input means for storing the data representing radiant energy pulses, means optically connected to said data storage means for reading out the stored data, means for accumulating the data read out from storage as desired, means also optically connected to said input switching means for storing the program representing radiant energy pulses, means for reading out the stored program, and means for converting the read out stored programs into electrical energy for the purpose of controlling the operation of all said switching, storage, read out, and accumulating means.

22. A data processing system in which perforations in a moving record material are optically sensed and converted into suitable program and data representing light pulses, input switching means, data storage means, program storage means, means between said input switching means and said data storage means for reading data into select areas of said data storage means, means between said input switching means and said program storage means for reading the program into select areas of said program storage means, accumulating means, means between said data storage means and said accumulating means for reading data out of selected areas of said storage means, program conversion means for changing program representing light pulses into program representing electrical pulses, means between said program storage means and said program conversion means for reading out the program stored in selected areas of said program storage means, and means controlled by said program conversion means for controlling the operation of all said readin, readout, storage and accumulating means.

23. An electro-optical data processing system in which data representing radiant energy pulses are processed automatically under the control of program representing radiant energy pulses, comprising electro-optical input means for distinguishing between said data and program representing radiant energy pulses, electro-optical means for storing groups of said data representing radiant energy pulses, electro-optical means for storing groups of said program representing radiant energy pulses, electro-optical means connected to said program storage means for converting said stored program representing radiant energy pulses into electrical energy pulses, switching means operated by said program representing electrical energy pulses for controlling the operation of all said electro-optical means, and counting means controlled by said switching means and said distinguishing means for determining the location in storage of selected data and program representing radiant energy pulses.

References Cited in the file of this patent

UNITED STATES PATENTS

| | | |
|---|---|---|
| 2,415,190 | Rajchman | Feb. 4, 1947 |
| 2,651,463 | Allen et al. | Sept. 8, 1953 |
| 2,672,288 | Perrin | Mar. 16, 1954 |
| 2,712,415 | Piety | July 5, 1955 |
| 2,727,683 | Allen et al. | Dec. 20, 1955 |
| 2,751,148 | Allen et al. | June 19, 1956 |